United States Patent [19]

Volk et al.

[11] 4,069,709
[45] Jan. 24, 1978

[54] FLOW RATE SENSOR

[75] Inventors: Joseph A. Volk, Florissant; Joseph A. Volk, Jr., St. Louis, both of Mo.

[73] Assignee: Beta Corporation, St. Louis, Mo.

[21] Appl. No.: 720,883

[22] Filed: Sept. 7, 1976

[51] Int. Cl.² ............................................. G01F 1/28
[52] U.S. Cl. ............................................... 73/228
[58] Field of Search ..................................... 73/228

[56] References Cited

U.S. PATENT DOCUMENTS

| 2,632,329 | 3/1953 | Zoehlke ................................ 73/228 |
| 2,775,890 | 1/1957 | Waldron ............................... 73/228 |
| 3,640,135 | 2/1972 | Tomiyasu et al. ..................... 73/228 |

FOREIGN PATENT DOCUMENTS

| 1,066,568 | 4/1967 | United Kingdom ................... 73/228 |
| 804,211 | 11/1958 | United Kingdom ................... 73/228 |
| 263,191 | 6/1970 | U.S.S.R. ................................. 73/228 |

*Primary Examiner*—Herbert Goldstein
*Attorney, Agent, or Firm*—Rogers, Eilers & Howell

[57] ABSTRACT

A flow rate sensor particularly for use with pelleted, granular, or powdered materials having a support and a pivotal member which is pivotally mounted to the support for pivotal movement about a generally vertical axis. An arm extends from the pivotal member and a deflection plate is mounted at the extended end of the arm for impingement of a vertical flow of material thereagainst such that the deflection plate resolves the vertical flow of material into a horizontal force component producing horizontal deflection of the deflection plate and angular deflection of the pivotal member about the pivotal axis. The pivotal mounting for the pivotal member includes a thin shim secured to the pivotal member and support providing flexing of the shim over a section thereof located between the pivotal member and the support. Also included is a transducer for translating the degree of deflection of the pivotal member into signals indicating the flow rate of the material, and a damper for dampening oscillation of the pivotal member.

26 Claims, 8 Drawing Figures

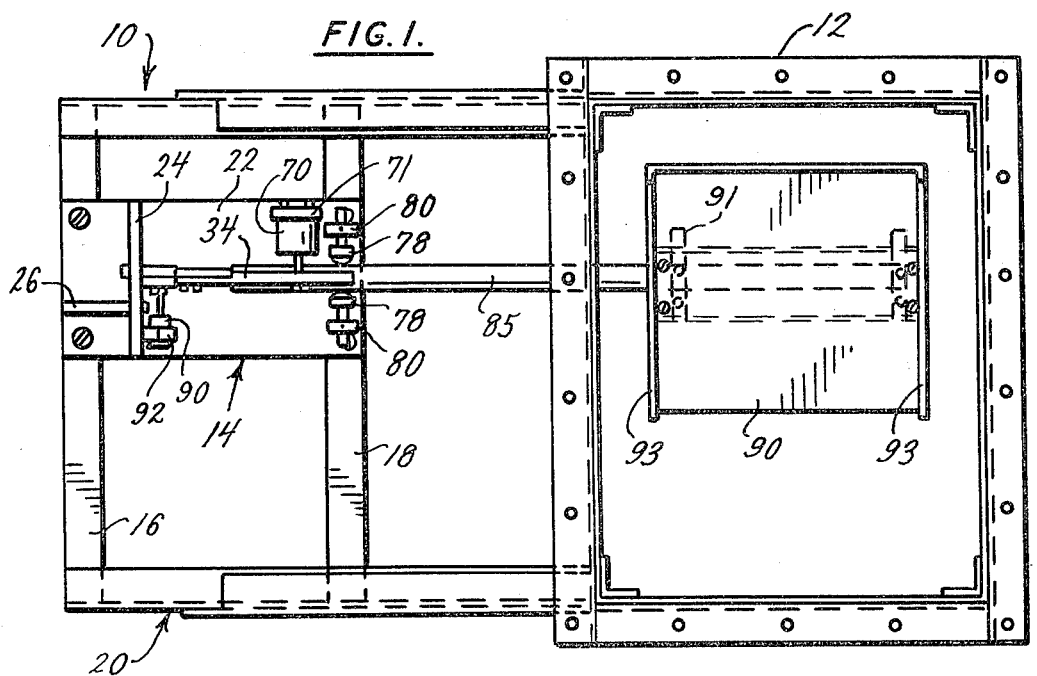
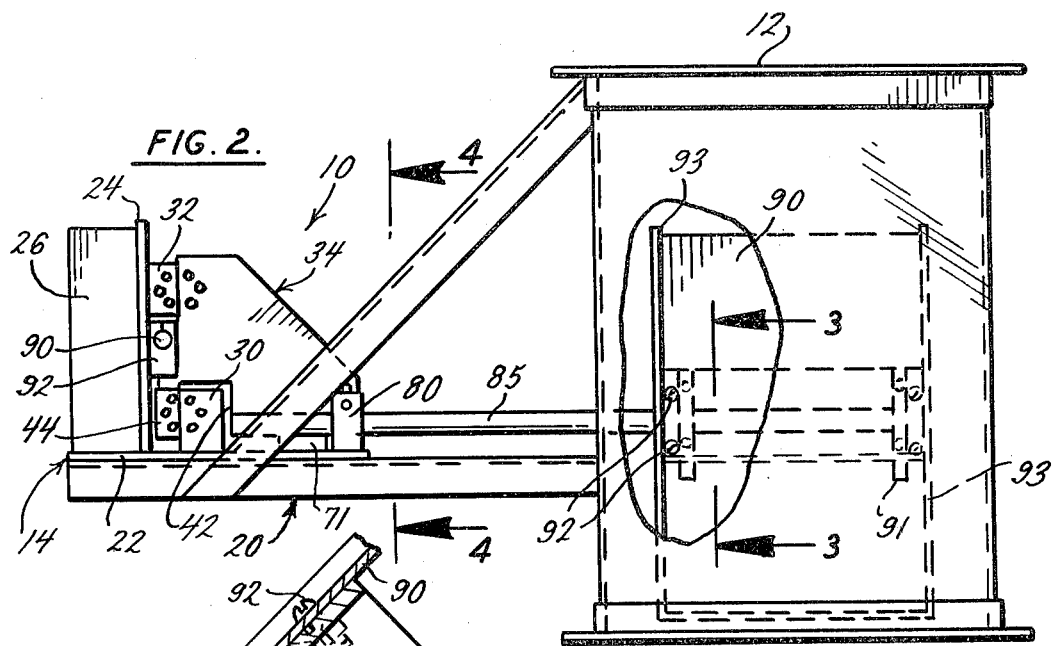
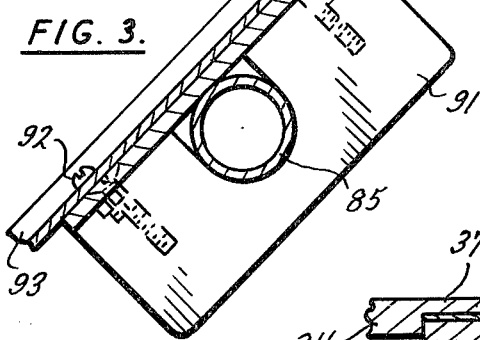
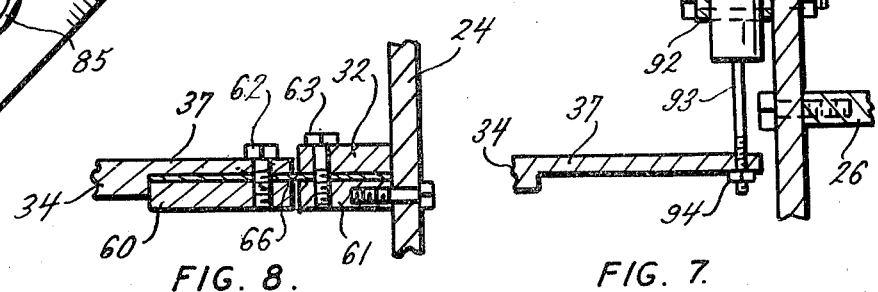

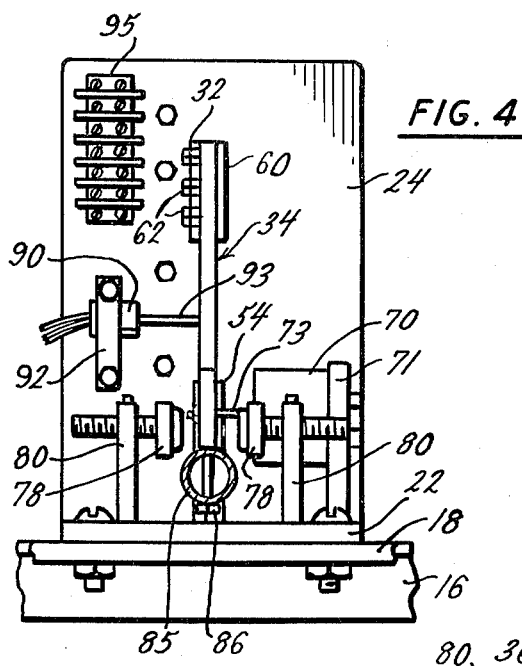
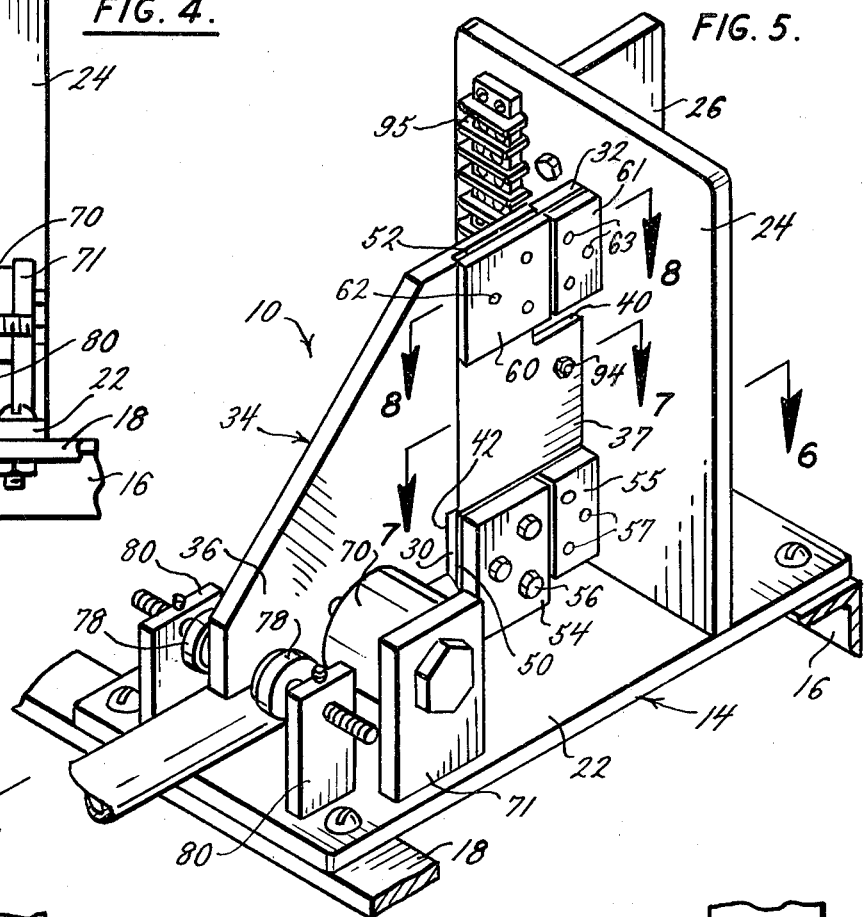
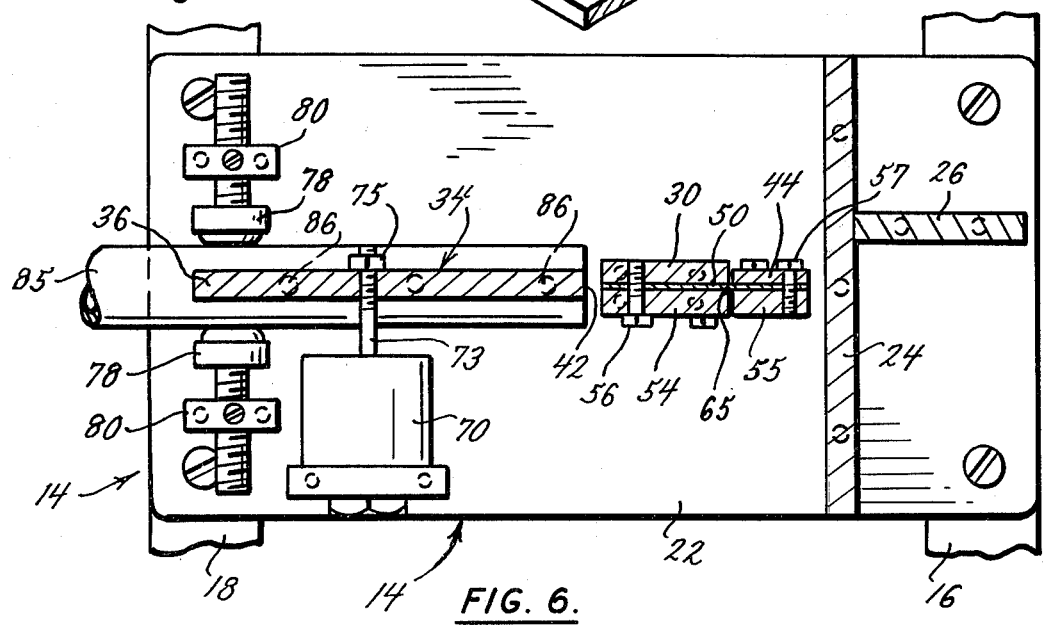

FLOW RATE SENSOR

BACKGROUND AND SUMMARY OF THE INVENTION

This invention generally relates to a flow rate sensor also known as a dry flow sensor, and particularly such a sensor for use in measuring the flow rate of pelleted, granular or powdered materials such as, for example, flour, soybeans, cement, and others too numerous to mention.

Dry flow sensors of this type are known in the art and generally consist of an angular deflection plate mounted at the end of an arm, which plate is placed in the flow path of the material to be metered. The other end of the arm is mounted to a support structure using some pivotal arrangement such as a torsion pin which allows the arm to swing only about an axis parallel to the direction of material flow. Since the deflection plate is mounted at an angle in the flow path of the material, the flow of the material against the deflection plate produces normal and parallel component forces. Since the arm is limited to only movement about the parallel axis, the vertical forces have no effect while the amount of deflection in the arm about the parallel axis is proportional to the flow rate of the material. Thus, the flow rate is measured in response to the degree of deflection of the deflection plate and arm.

The accuracy of these devices are dependent on the ability to translate the flow of the material into a pivotal deflection with a minimum of tolerance, so that the design and structure of the pivotal arrangement for mounting the arm to the support becomes critical. A standard pivot pin arrangement, while relatively inexpensive, possesses more play or tolerance than is desirable, adversely affecting the accuracy of the readings. Other hinge arrangements have been used with success, but they are relatively complex and expensive. These include the use of a torsion pin of a type manufactured by Bendix Corporation.

This invention represents an improvement over these prior art sensors and particularly over the pivotally mounting arrangement for the deflection arm.

Generally, the sensor of this invention comprises an angled deflection plate mounted at the end of an arm, the other end of which is pivotally mounted to a support structure. The pivotally mounting arrangement generally includes a shim of thin gauge material such as stainless steel which is held firmly attached to the arm and to the support structure such that the shim is allowed to deflect within its elastic limits over a section thereof, whereby the arm is held firmly against horizontal and vertical movement but is allowed limited pivotal movement. The shim is relatively free in its hinge action and also provides a spring return force for the arm. Means, such as a dash pot or the like, are provided to dampen the pivotal movement of the arm, and further means, such as a transducer, are provided for translating the degree of pivotal movement of the arm into a flow rate indication.

Thus, it is a primary object of this invention to provide an improved dry flow sensor where flow rate is proportional to the degree of pivotal deflection of an arm member, with an improved pivotal mounting arrangement for the arm which minimizes horizontal and vertical movements of the arm and hence increases the accuracy and sensitivity of the sensor and which is relatively friction free and provides a spring return force for the arm.

This and other objects of the invention will become apparent from the drawing and detailed description to follow.

DESCRIPTION OF THE DRAWINGS

FIG. 1 is a plan view of a flow rate sensor of this invention shown mounted in a section of a vertical chute;

FIG. 2 is a side elevation view, with a portion cut away, of the sensor of FIG. 1;

FIG. 3 is an enlarged view in section taken generally along the line 3—3 of FIG. 2;

FIG. 4 is an enlarged section taken generally along the line 4—4 of FIG. 2;

FIG. 5 is an isometric view of the support and pivotal mounting structure of the sensor of FIG. 1;

FIG. 6 is a view in section taken generally along the line 6—6 of FIG. 5;

FIG—7 is a view in section taken generally along the line 7—7 of FIG. 5; and

FIG. 8 is a view in section taken generally along the line 8—8 of FIG. 5.

DETAILED DESCRIPTION OF A PREFERRED EMBODIMENT

Referring to the drawing there is shown a flow rate sensor 10 mounted to a section 12 of a vertical chute through which a material is made to flow vertically downwardly by gravity. The purpose of the sensor of this invention is to measure the flow rate of that material and it is particularly suited for dry pelleted, granular, or powdered materials.

The sensor 10 has a support structure 14 secured to members 16 and 18 of a frame 20, which frame is mounted to the chute section 12 and extends to one side thereof. The support structure 14 has a base plate 22 mounted to the frame members 16 and 18, a vertical plate 24 mounted to the base plate 22, and a reinforcing vertical plate 26 secured to both the base plate and plate 24. A support member 30 is mounted to and extends upwardly from the base plate 22 and is spaced from the vertical plate 24. Another support member 32 is mounted to and extends forwardly from the vertical plate 24 at a location above the mounting plate 30.

A pivotal member 34 has a forward portion 36 and a rearward portion 37 which extends between the supports 30 and 32. The rearward portion 37 is preferably machined to be of somewhat less thickness than the forward portion 36 and has an upper notch 40 and a lower notch 42 formed therein. The support plate 32 extends within the notch 40, and the rearward portion 37 has a downwardly extending portion 44 located between the support 30 and vertical plate 24 with the support 30 extending within the notch 42.

As shown in FIGS. 6 and 8, the pivotal member 34 is pivotally mounted to the supports 30 and 32 by means of shims 50 and 52, respectively, which are preferably of stainless steel or the like. The shim 52 is firmly clamped to the support 30 and to the downwardly extending portion 44 of the pivotal member 34 by means of clamping plates 54 and 55 and suitable bolts 56 and 57. The shim 52 is securely fastened to the upper rear portion 37 of the pivotal member 34 and to the support 32 by means of clamping plates 60 and 61 and suitable bolts 62 and 63.

It is a feature of this invention that the shims 50 and 52 act as hinges which allow for limited pivotal movement about the vertical axis but prevent any vertical or transverse movement of the pivotal member 34 relative to the members 30 and 32. The shims 50 and 52 also provide a rearly friction free hinge and a spring return force for the pivotal member. This is accomplished by firmly clamping the shims in place but leaving sections 65 and 66 of the shims 50 and 52, respectively, unclamped so as to allow pivotal flexing at those sections. In a preferred embodiment, these sections 65 and 66 are in vertical alignment.

A damping device 70, such as a dash pot, is suitably mounted to a vertical support 71 extending upwardly from the base 22. The dash pot 70 has a piston shaft 73 secured to the forward portion 36 of the pivotal member 34 by means of a threaded nut 75 or the like and acts to dampen pivotal oscillations of the pivotal member 34. The dash pot 70 may be, for example, an Airport Corporation Model 444, 2-way.

Adjustable bumpers 78 are mounted to vertical supports 80 on opposite sides of the pivotal member 34 at its forward end. These bumpers act as stops to limit the pivotal movement of the pivotal member 34 and thus prevent excessive movement which would cause the shims 50 and 52 to flex beyond their elastic limits.

An arm 85 is mounted at one end to the bottom of the pivotal member 34 by means of bolts 86. The arm 85 extends through a suitable opening in the wall of the chute section 12 and a deflection plate 90 is mounted at the forward end thereof. The deflection plate 90 is secured to the arm 85 within the chute section 12 by a suitable L-shaped bracket 91 and bolts 92. The upper surface of the deflection plate 90 generally defines a plane with upturned sides 93 that is parallel to an axis normal to the pivotal axis of the pivotal member 34 and is inclined relative to vertical about 30° (FIG. 3), although greater or lesser degrees of inclination may be used. The purpose for the deflector 90 is to translate the vertical force of the falling material that impinges on the plate into vertical and horizontal components, the vertical component being cancelled and the horizontal component causing a pivotal movement of the arm 85 and pivotal member 34 about the vertical axis defined by the shim sections 65 and 66.

A transducer 90 is mounted to a support 92 extending from the vertical plate 24 and has a shaft 93, the end of which is attached such as by a nut 94 to the rear portion 37 of the pivotal member 34 at a location rearwardly of the pivotal axis. The transducer 90 is of a type that translates extension and retraction of the shaft 93 into electrical signals which are used to operate a flow meter or the like (not shown). The transducer 90 may, for example, be a Hewlett Packard Model 7 DCDT. A suitable terminal board 95 is mounted to the vertical plate 24 for making the necessary electrical connections.

OPERATION

In operation, a vertical downward flow of material, such as a pelleted, granular, or powdered material, through the chute section 12, impinges upon the deflection plate 90. This vertical force is translated by the inclined deflection plate into a horizontal and vertical component. Since the pivotal member 34 is allowed to move only pivotally about a vertical axis, the vertical force component is cancelled and the horizontal component produces a corresponding pivotal deflection of the arm 85 and pivotal member 34 about the vertical axis defined by the shim sections 65 and 66. The width of the shim section 65 is defined by the spacing between the clamping plates 54 and 55 and between support plate 30 and downwardly extending portion 44. The width of the shim section 66 is defined by the spacing between the clamping plates 60 and 61 and between the rear portion 37 of the pivotal member 34 and the support plate 32. It has been found that excellent results are obtained where the width of the shim sections are approximately equal to the shim thickness.

The thickness of the shims is chosen to accommodate the range of flow rates expected. For example, a shim thickness of 0.031 inches might be used for a range of 0–1500 lbs./mins., 0.020 inches for a range of 0–500 lbs./min., and 0.010 inches for a range of 0–30 lbs./min.

Hence, the shims acting as hinges and springs provide an exceptionally reliable means for translating the rate of flow of the material into a pivotal deflection of the pivotal member 34 about the vertical axis.

This pivotal movement of the pivotal member 34 produces a movement of its rearward portion where the transducer 90 is attached, the transducer translating this pivotal movement into electrical signals for operating a flow meter of the like. The dash pot 70 dampens pivotal oscillations of the pivotal member 34 and the adjustable bumpers 78 act as limits or stops to prevent excessive pivotal movement of the member 34 which might deflect the shims 50 and 52 beyond their elastic limits.

It will be noted that both of the shims 50 and 52 are under tension by weight of the forward end of the pivotal member 34, the arm 85, and the deflection plate 90, and the shim sections 65 and 66 are in vertical alignment to insure accuracy.

Thus, there has been described an improved flow rate sensor providing a pivotal mounting arrangement for the arm which minimizes horizontal and vertical movements of the arm while allowing pivotal deflection about a generally vertical axis and which increases the accuracy and sensitivity of the sensor.

Various changes and modifications may be made in this invention, as will be readily apparent to those skilled in the art. Such changes and modifications are within the scope and teaching of this invention as defined by the claims appended hereto.

What is claimed is:

1. A sensor for measuring the flow rate of a material comprising a support member and a pivotal member, means for mounting said pivotal member to said support member for pivotal movement thereabout, means responsive to the rate of flow of a material for pivotally deflecting said pivotal member, the degree of deflection being proportional to the rate of flow, said pivotal mounting means further comprising a thin shim, means for securing said shim to said pivotal and support members providing flexing of said shim over a section thereof located between said pivotal and support member, the width of the section of said shim over which said shim flexes being approximately that of the shim thickness.

2. The sensor of claim 1 wherein said pivotal mounting means further comprises a plurality of shims with their flexing sections spaced apart and axially aligned, the flexing sections of all said shims being in tension.

3. The sensor of claim 1 further comprising means limiting the angular movement of said pivotal member.

4. The sensor of claim 3 wherein said limiting means further comprises adjustable bumpers mounted to said support means and which engage said pivotal member upon a predetermined angular deflection of said pivotal member.

5. The sensor of claim 3 wherein said limiting means further comprises abutments associated with both the pivotal and support members adjacent the flexing section of said shim which contact upon flexing of said shim to predetermined limits.

6. The sensor of claim 1 further comprising means for damping oscillating pivotal deflections of said pivotal member.

7. The sensor of claim 1 further comprising means responsive to the degree of deflection of said pivotal member for indicating the flow rate of said material.

8. The sensor of claim 7 wherein said indicating means further comprises an electrical transducer having means for producing electrical signals in response to the degree of movement of a movable member, and means for mounting said transducer for movement of said movable member in response to deflection of said pivotal member.

9. A sensor for measuring the flow rate of a material comprising support means, a pivotal member, means for mounting said pivotal member to said support means for pivotal movement about a vertical axis, an arm engaged with and extending from said pivotal member to pivot with the pivotal member about said vertical axis, deflection means comprising a plate having a substantially flat surface mounted at the extended end of said arm for impingement of a vertical flow of material against the surface, said plate surface extending in a plane transverse to said vertical axis, said deflection plate resolving said vertical flow of material into a horizontal force component, so that horizontal deflection of said deflection plate produces pivotal movement of the arm about said vertical axis and angular deflection of said pivotal member about said pivotal axis, said pivotal mounting means further comprising a thin shim, means for securing said shim to said pivotal member and support means with the shim extending in a plane transverse to the plane of the deflection plate surface and in a plane parallel to the vertical axis providing flexing of said shim over a section thereof located between said pivotal member and said support means when the pivot member pivots about the vertical axis with the shim remaining aligned parallel to the pivotal axis during said flexing, and means responsive to the degree of deflection of said pivotal member for indicating the flow rate of said material.

10. The sensor of claim 9 wherein said deflection plate is angularly displaced at the extending end of said arm relative to the direction of flow of said material.

11. The sensor of claim 10 wherein the support means further comprises a base plate and a vertical plate, a first member mounted to said vertical plate, a second member mounted to said base plate and spaced from said vertical plate, said pivotal member having a portion thereof positioned between said second member and said vertical plate, means for securing a first shim to said pivotal member and said first member, and means for attaching a second shim to said second member and to the portion of said pivotal member between said second member and said vertical plate.

12. The sensor of claim 9 wherein said indicating means further comprises means responsive to the degree of deflection of a portion of said pivotal member on the side of said vertical axis opposite said arm for indicating the flow rate of said material.

13. The sensor of claim 12 wherein said indicating means further comprises an electrical transducer having means for producing electrical signals in response to the degree of movement of a movable member, and means for mounting said transducer for movement of said movable member in response to the deflection of the portion of said pivotal member on the side of the pivotal vertical axis opposite the extending arm.

14. The sensor of claim 9 wherein the width of the narrow section of said shim over which said shim flexes is approximately that of the shim thickness.

15. The sensor of claim 9, wherein said pivotal mounting means further comprises a plurality of shims, means for securing each said shim to said pivotal member and support means with the shims extending in planes transverse to the plane of the deflection plate surface providing flexing of said shims over a section thereof located between said pivotal member and support means, the sections of said shims being spaced apart vertically and in axial alignment.

16. The sensor of claim 9 further comprising means limiting the angular movement of said pivotal member.

17. The sensor of claim 16 wherein the limiting means further comprises adjustable bumpers mounted to said support means.

18. The sensor of claim 17 wherein said limiting means further comprises abutments associated with both the pivotal member and support means adjacent the flexing section of said shim which contact upon flexing of said shim to predetermined limits.

19. The sensor of claim 9 further comprising means for damping oscillating pivotal deflections of said pivotal member.

20. The sensor of claim 9 wherein the means for securing said shim further comprises a first plate, means for clamping one portion of said shim between said first plate and said pivotal member, a second plate, and means for clamping a second portion of said shim between said second plate and said support means leaving only a vertical section of said shim extending between said first and second plates and between said pivotal member and support means free to flex within limits about a vertical axis.

21. A sensor for measuring the flow rate of a material comprising support means, said support means comprising a base plate and a vertical plate, a pivotal member, a first member mounted to said vertical plate, a second member mounted to said base plate and spaced from said vertical plate, said pivotal member having a portion thereof positioned between said second member and vertical plate, means for securing a first shim to said pivotal member and said first member, and means for attaching a second shim to said second member and to the portion of said pivotal member between said second member and said vertical plate, and mounting of the pivotal member to the first and second members providing pivotal movement about a vertical axis, said mounting of the shim providing flexing of said first shim over a section thereof located between said pivotal member and said first member, and said mounting providing flexing of said second shim over a section thereof located between said pivotal member and said second member, an arm extending from said pivotal member, deflection means mounted at the extended end of said arm for impingement of a vertical flow of material thereagainst, said deflection means resolving said vertical flow of material into a horizontal force component, so that horizontal deflection of said deflection means produces angular deflection of said pivotal member about said pivotal axis, and means responsive to the degree of deflection of said pivotal member for indicating the flow rate of said material.

22. A sensor for measuring the flow rate of material comprising support means, a pivotal member, means for mounting said pivotal member to said support means for pivotal movement about a vertical axis, an arm extending from said pivotal member, deflection means mounted at the extension end of said arm for impingement of the vertical flow of material thereagainst, said deflection means resolving said vertical flow of material into a horizontal force component so that horizontal deflection of said deflection means produces angular deflection of said pivotal member about said pivotal axis, said pivotal mounting means further comprising a thin shim, means for securing said shim to said pivotal member and support means providing flexing of said shim over a section thereof located between said pivotal member and said support means, said section having a width approximately that of the shim thickness, and means responsive to the degree of deflection of said pivotal member for indicating the flow rate of said material.

23. A sensor for measuring the flow of material comprising:
 a. a support;
 b. a pivotal member;
 c. means to pivotally mount the pivotal member to the support comprising at least two thin shims, and means for securing the shims to the pivotal member and support to provide flexing of the shims over sections of the shims located between the pivotal member and support so that when a bending force is applied to the pivotal member to cause tension on one of the shims the other shim will also be in tension;
 d. an arm, deflection means mounted on the arm for impingement of vertical flow of material thereagainst, said deflection means resolving said vertical flow of material into a horizontal force component, with means to mount the arm to the pivotal member so that the force of material against the deflection means produces a bending moment on the pivotal member causing the shims to be in tension.

24. The structure of claim 23 wherein there is a top shim above a bottom shim, the top and bottom shims each having front and rear ends; means attaching the front of the top shim to the pivotal member and the rear of the top shim to the support, and means attaching the front of the bottom shim to the support and the rear of the bottom shim to the pivotal member; and wherein the arm is mounted to the pivotal member in front of the bottom shim so that downward force applied on the arm exerts a force on the pivotal member in front of the bottom shim.

25. A sensor for measuring the flow rate of a material comprising a support member and a cantilevered arm, means for mounting said arm at one end to said support member for pivotal movement about at least one generally vertical axis, deflection means at the extended end of said arm for impingement of a vertical flow of material thereagainst, said deflection means resolving said vertical flow of material into horizontal and vertical force components, said horizontal force component producing an angular deflection of said arm about said axis, said pivotally mounting means further comprising a plurality of shims, means for securing said shims to said arm and support member providing flexing of said shims about said axis and over sections thereof located between said arm and support member, the flexing sections of said shims being in tension under the vertical force component.

26. The sensor of claim 25 wherein the flexing sections of said shims are spaced apart and axially aligned.

* * * * *